US012730719B2

(12) United States Patent
Narayanasamy et al.

(10) Patent No.: US 12,730,719 B2
(45) Date of Patent: Sep. 8, 2026

(54) SYSTEMS AND METHODS FOR OPTIMIZING JOB EXECUTION IN ON-DEMAND CODE EXECUTION SYSTEM

(71) Applicant: FMR LLC, Boston, MA (US)

(72) Inventors: Praveen Narayanasamy, Karnataka (IN); Rahul Narayanan, Tamil Nadu (IN); Dhinu Prashanth Radhakrishnan, Karnataka (IN); Sukanya Kumaraswamy, Tamil Nadu (IN); Jamunadevi Vijayan, Tamil Nadu (IN)

(73) Assignee: FMR LLC, Boston, MA (US)

( * ) Notice: Subject to any disclaimer, the term of this patent is extended or adjusted under 35 U.S.C. 154(b) by 23 days.

(21) Appl. No.: 19/041,605

(22) Filed: Jan. 30, 2025

(65) Prior Publication Data

US 2026/0219992 A1 Jul. 30, 2026

(51) Int. Cl.
*G06F 11/14* (2026.01)

(52) U.S. Cl.
CPC .... *G06F 11/1402* (2013.01); *G06F 2201/865* (2013.01)

(58) Field of Classification Search
CPC .. G06F 11/14; G06F 11/1402; G06F 11/1415; G06F 11/202; G06F 11/2023; G06F 11/203; G06F 2201/865
See application file for complete search history.

(56) References Cited

U.S. PATENT DOCUMENTS 9,448,824 B1 * 9/2016 Fitzgerald ........... G06F 9/45533
12,423,161 B1 * 9/2025 Ni ......................... G06F 9/5083
2010/0325473 A1 * 12/2010 Agneeswaran ..... G06F 11/2041 714/E11.078
2016/0048415 A1 * 2/2016 Sarma .................. G06F 9/5083 718/104
2021/0132947 A1 * 5/2021 John ..................... G06F 9/5038
2024/0045713 A1 * 2/2024 Webb ................. G06F 11/3433

* cited by examiner

*Primary Examiner* — Gabriel Chu
(74) *Attorney, Agent, or Firm* — Cesari and McKenna, LLP

(57) ABSTRACT

Systems and methods are described for optimizing job execution on an on-demand code execution system. More specifically, the job execution manager may receive requests to execute jobs on an on-demand code execution system. The job execution manager may forecast the runtime of the job by using two or more machine learning models. The two or more machine learning models may generate a runtime prediction set that includes two or more runtime predictions based on metadata of the job. A final runtime prediction is determined based on the runtime prediction set. Based on the final runtime prediction, the job execution manager determines a compute instance on which to execute the job. In case that the job execution manager determines an error has occurred in the compute instance, the job execution manager attempts to execute the job on another larger compute instance.

24 Claims, 8 Drawing Sheets

| Runtime Prediction Set A | | |
|---|---|---|
| Machine Learning Model A | Runtime Prediction 1A | 10 seconds |
| Machine Learning Model B | Runtime Prediction 2A | 11 seconds |
| Machine Learning Model C | Runtime Prediction 3A | 12 seconds |
| Machine Learning Model D | Runtime Prediction 4A | 9 seconds |
| Machine Learning Model E | Runtime Prediction 5A | 6 seconds |
| **Average of Runtime Predictions** | **Final Runtime Prediction A** | 9.6 seconds |

FIG. 3A

| Runtime Prediction Set B | | |
|---|---|---|
| Machine Learning Model F | Runtime Prediction 1B | 13 minutes |
| Machine Learning Model G | Runtime Prediction 2B | 16 minutes |
| Machine Learning Model H | Runtime Prediction 3B | 15 minutes |
| Machine Learning Model I | Runtime Prediction 4B | 16 minutes |
| **Longest Runtime Prediction** | **Final Runtime Prediction B** | 16 minutes |

FIG. 3B

SYSTEMS AND METHODS FOR OPTIMIZING JOB EXECUTION IN ON-DEMAND CODE EXECUTION SYSTEM

TECHNICAL FIELD

This application relates generally to systems and methods, including computer program products, for optimizing job execution in an on-demand code execution system.

BACKGROUND

Serverless computing has become a widely used tool in software development due to the many advantages that it provides over traditional computing structures. Software developers can write code from anywhere as long as there is an internet connection between the developer's device and the serverless computing system. In addition, developers can focus on writing code, without having to worry about infrastructure management since the provider of the serverless computing system manages the physical structure of the system and handles operating system and security updates. Further, because data is stored in the serverless computing system, any malfunction or damage upon the developer's device does not cause data to be permanently deleted or irretrievable.

Nevertheless, even though there are many benefits to serverless computing systems, there are also disadvantages as well. When executing code (e.g., jobs) on a serverless computing system, it is not always the case that the job executes successfully. In other words, the serverless computing system may fail to execute the job for a variety of reasons. One reason may stem from a time limit imposed when executing jobs. When the job runs longer than the specified time limit, the serverless computing system automatically terminates the job, thereby leading to failure in job execution. In a similar vein, the serverless computing system may also impose a resource limit when executing jobs. More specifically, the serverless computing system may allocate a fixed amount of processing and memory resources. Exceeding such processing and memory limits may lead to termination of the job, thereby leading to failure in job execution.

Such failure may have a significant negative impact due to the nature of the job. For example, the job may be time-sensitive, in which the job is expected to be successfully executed within a specific timeframe. In the case that the job fails to execute successfully within such timeframe, there may be negative repercussions. For example, an application for fraud detection may be running on the serverless computing system. Failure to execute a job that identifies or detects fraud in transactions (e.g., money laundering) can lead to fraud being successfully accomplished by malicious actors. In another example, video streaming may be facilitated by an application running on the serverless computing systems. Interruptions in job executions associated with the application may likely disrupt the streaming. In yet another example, online video games (e.g., massively multiplayer online (MMO) game) may run on the serverless computing system. When a job (associated with the video game) fails to execute, it affects the gameplay by increasing latency and responsiveness thereby rendering the game unplayable.

It should be noted that, while there are mechanisms in place to handle job execution failures, such mechanisms are often inadequate (especially in cases of time-sensitive jobs) to address such failures. For example, there may be a job retry mechanism in which the serverless computing system attempts to execute the job again (retry job). However, many serverless computing systems utilize a predefined delay (between each job retry attempt) that involves exponential backoff in which the delay increases exponentially with each retry. While the exponential backoff allows for the serverless computing system to avoid being overwhelmed when there are recurring errors, the ever-increasing delay is fatal to time-sensitive jobs.

As such, there remains a need for a solution to address the issue of failure in job executions in a serverless computing system.

SUMMARY

The present disclosure, in one aspect, features a computing system for optimizing job execution on an on-demand code execution system, the system comprising memory for storing computer-executable instructions and a processor that executes the computer-executable instructions to: receive instructions to execute a job having user code on the on-demand code execution system which comprises one or more compute instances that are ordered sequentially based on size; generate, via two or more machine learning models, a runtime prediction set for the job, the runtime prediction set including a runtime prediction that is generated by each machine learning model of the two or more machine learning models, wherein each runtime prediction is a forecast of the runtime associated with executing the job; assign a compute instance of the one or more compute instances to the job based on a runtime type of the job, wherein the runtime type of the job is determined based on the runtime prediction having the longest runtime; and continuously attempt to execute the job on the compute instance, wherein the job is assigned a new compute instance that is larger in size than a current compute instance upon detection of an execution error when attempting to execute the job on the current compute instance.

The one or more compute instances includes a serverless environment and a container environment, the container environment having one or more containers that are ordered sequentially based on size. The runtime type is selected from one or more runtime types, and wherein a first runtime type is associated with the serverless environment, and the remaining runtime types are associated with the one or more containers in the container environment. The computer executable instructions cause the processor to perform further operations to: determine that two or more jobs are each assigned a first runtime type and are each capable of being executed independently from each other; and execute the two or more jobs in parallel in the serverless environment. The computer executable instructions cause the processor to perform further operations to: detect an execution error when attempting to execute the two or more jobs in parallel in the serverless environment; and execute the two or more jobs in parallel in at least one of the one or more containers in the container environment. A job associated with a first runtime type is associated with at least one of the following execution types: transmitting a file, loading a file, sending email notifications, and calling a function associated with Structured Query Language (SQL). The remaining runtime types includes a second runtime type and a third runtime type, and wherein the first runtime type is associated with a time period that is greater or equal to zero and less than five minutes, the second runtime type is associated with a time period that is greater than or equal to five minutes and less than fifteen minutes, and the third runtime type is associated with a time period that is greater than or equal to fifteen minutes. The runtime prediction is determined based on metadata of the job, wherein the metadata includes at least one of execution type, data size, file size, and job identifier. The execution error includes at least one of the following: failure to load data into the compute instance, insufficient memory in the compute instance to load data into, insufficient memory in the compute instance to execute the job, and failure in portions of the on-demand code execution system. The size of the compute instance corresponds to at least one of the memory of the compute instance, the processing power of the computer instance, and a maximum permitted time that a job is allowed to execute on the compute instance. The two or more machine learning models are continuously trained, at predetermined time intervals, by using historical job data corresponding to one or more jobs that were executed successfully or unsuccessfully. The two or more machine learning models includes at least one of Neural Basis Expansion Analysis with Exogenous Variables (NBEATSx), Neural Hierarchical Interpolation for Time Series Forecasting (N-HITS), Extreme Gradient Boosting (XGBoost), and Light Gradient Boosting Machine (LightGBM).

The present disclosure, in another aspect, features a computerized method for optimizing job execution on an on-demand code execution system, the method comprising: receiving instructions to execute a job having user code on the on-demand code execution system which comprises one or more compute instances that are ordered sequentially based on size; generating, via two or more machine learning models, a runtime prediction set for the job, the runtime prediction set including a runtime prediction that is generated by each machine learning model of the two or more machine learning models, wherein each runtime prediction is a forecast of the runtime associated with executing the job; assigning a compute instance of the one or more compute instances to the job based on a runtime type of the job, wherein the runtime type of the job is determined based on the runtime prediction having the longest runtime; and continuously attempting to execute the job on the compute instance, wherein the job is assigned a new compute instance that is larger in size than a current compute instance upon detection of an execution error when attempting to execute the job on the current compute instance.

The one or more compute instances includes a serverless environment and a container environment, the container environment having one or more containers that are ordered sequentially based on size. The runtime type is selected from one or more runtime types, and wherein a first runtime type is associated with the serverless environment, and the remaining runtime types are associated with the one or more containers in the container environment. The computerized method further comprises: determining that two or more jobs are each assigned a first runtime type and are each capable of being executed independently from each other; and executing the two or more jobs in parallel in the serverless environment. The computerized method further comprises: detecting an execution error when attempting to execute the two or more jobs in parallel in the serverless environment; and execute the two or more jobs in parallel in at least one of the one or more containers in the container environment. A job associated with a first runtime type is associated with at least one of the following execution types: transmitting a file, loading a file, sending email notifications, and calling a function associated with Structured Query Language (SQL). The remaining runtime types includes a second runtime type and a third runtime type, and wherein the first runtime type is associated with a time period that is greater or equal to zero and less than five minutes, the second runtime type is associated with a time period that is greater than or equal to five minutes and less than fifteen minutes, and the third runtime type is associated with a time period that is greater than or equal to fifteen minutes. The runtime prediction is determined based on metadata of the job, wherein the metadata includes at least one of execution type, data size, file size, and job identifier. The execution error includes at least one of the following: failure to load data into the compute instance, insufficient memory in the compute instance to load data into, insufficient memory in the compute instance to execute the job, and failure in portions of the on-demand code execution system. The size of the compute instance corresponds to at least one of the memory of the compute instance, the processing power of the computer instance, and a maximum permitted time that a job is allowed to execute on the compute instance. The two or more machine learning models are continuously trained, at predetermined time intervals, by using historical job data corresponding to one or more jobs that were executed successfully or unsuccessfully. The two or more machine learning models includes at least one of Neural Basis Expansion Analysis with Exogenous Variables (NBEATSx), Neural Hierarchical Interpolation for Time Series Forecasting (N-HITS), Extreme Gradient Boosting (XGBoost), and Light Gradient Boosting Machine (LightGBM).

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

FIG. 3A is an example diagram illustrating a runtime prediction set in accordance with aspects of the present disclosure.

FIG. 3B is an example diagram illustrating a runtime prediction set according to another embodiment in accordance with aspects of the present disclosure.

DETAILED DESCRIPTION

Figure 1:
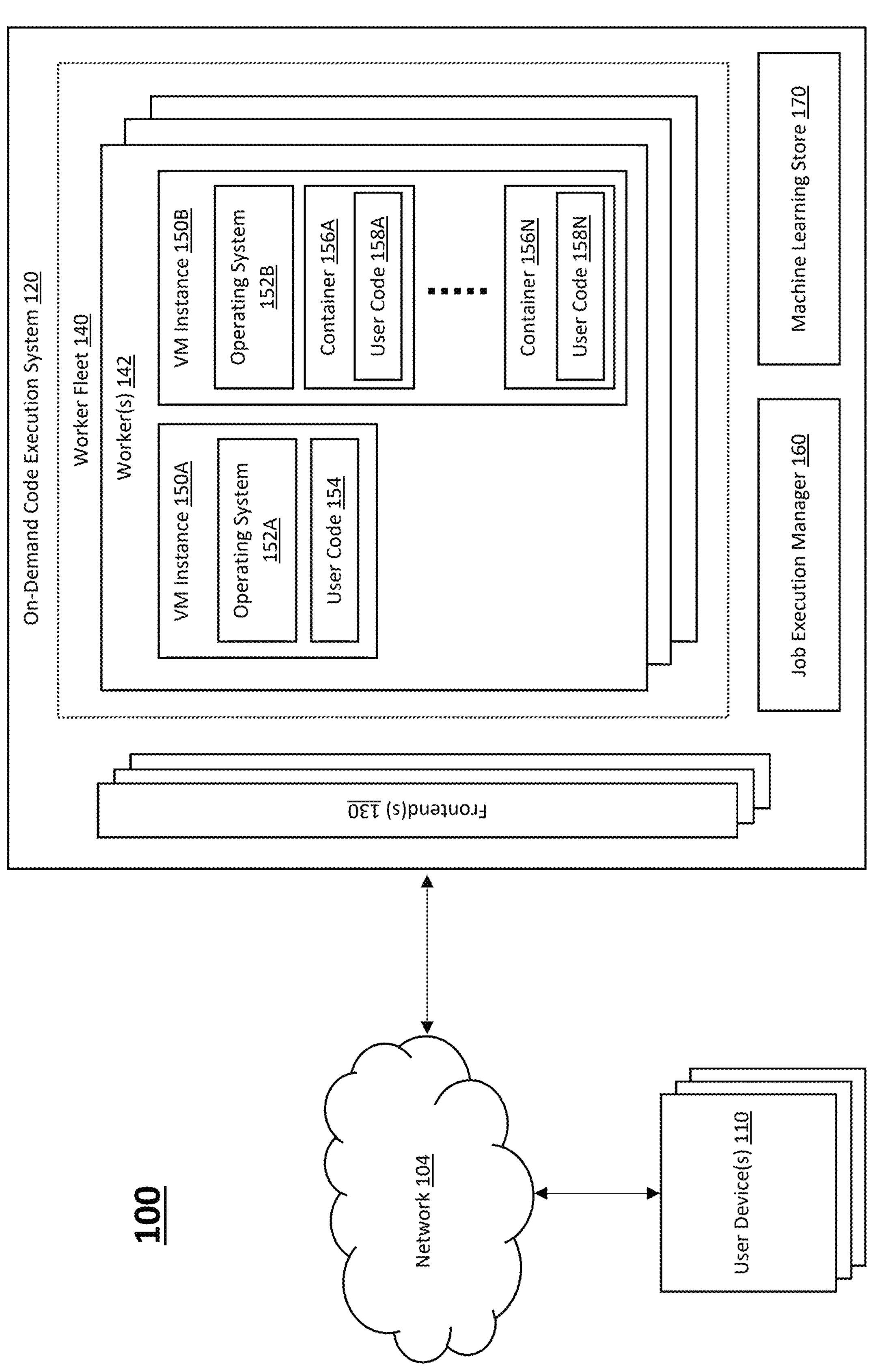
FIG. 1 is a block diagram of a depicting an illustrative environment in which a worker manager manages execution of a job on an on-demand code execution system in accordance with aspects of the present disclosure.

In describing preferred embodiments illustrated in the drawings, specific terminology is employed herein for the sake of clarity. However, this disclosure is not intended to be limited to the specific terminology so selected and it is to be understood that each specific element includes all technical equivalents that operate in a similar manner. In addition, a detailed description of known functions and configurations is omitted from this specification when it may obscure the inventive aspects described herein.

Various tools are discussed herein to facilitate the invention(s) disclosed herein. It should be appreciated by those skilled in the art that any one or more of such tools may be embedded in the application and/or in any of various other ways, and thus while various examples are discussed herein, the inventive aspects of this disclosure are not limited to such examples described herein. Generally described, aspects of the present disclosure relate to an on-demand code execution system. The on-demand code execution system enables rapid execution of code, which may be supplied by users of the on-demand code execution system.

As described herein, an on-demand code execution system (which may also be referred to as a "serverless code execution system" or a "serverless compute system") enables rapid execution of code, which may be supplied by users of the serverless compute system. Upon submitting code, the on-demand code execution system can then enable the user to submit "calls" or "invokes" to execute the code, at which point the serverless compute system will generate an execution environment for the code and execute the code within the environment to provide the desired functionality. The environment can then be destroyed shortly after providing the desired functionality, such that a user is responsible only for resources used during execution. These execution times are often very short, making serverless computing highly efficient, particularly for tasks with varying demand levels. Because the serverless compute system (and not the end user) generally handles management of execution environments, these systems are generally referred to as "serverless," despite the general use of servers to support such environments.

The on-demand code execution system, as described in detail herein, may provide a network-accessible service enabling users to submit or designate computer-executable code to be executed by isolated execution environments on the on-demand code execution system. Each set of code on the on-demand code execution system may define a "task" (or "job") and implement specific functionality corresponding to that task when executed on an execution environment, such as a virtual machine instance, of the on-demand codex execution system. Individual implementations of the task on the on-demand code execution system may be referred to as an "execution" system of the task (or a "task execution").

The on-demand code execution system can further enable users to trigger execution of a task based on a variety of potential events, such as detecting new data at a network-based storage system, transmission of an application programming interface ("API") call to the on-demand code execution system, or transmission of a specifically formatted hypertext transport protocol ("HTTP") packet to the on-demand code execution system. Thus, users may utilize the on-demand code execution to execute any specified executable code "on-demand," without requiring configuration or maintenance of the underlying hardware or infrastructure on which the code is executed. Further, the on-demand code execution system may be configured to execute tasks in a rapid manner (e.g., in under 100 milliseconds [ms]), thus enabling execution of tasks in "real-time" (e.g., with little or no perceptible delay to an end user).

The on-demand code-execution system may thus allow users to execute code in a serverless environment (e.g., one in which the underlying server is not under user control). The term "serverless environment," as used herein, is intended to refer to an environment in which responsibility for managing generation, configuration, and state of an underlying execution environment is abstracted away from a user, such that the user need not, for example, create the execution environment, install an operating system within the execution environment, or manage a state of the environment in order to execute desired code in the environment. Similarly, the term "server-based environment" is intended to refer to an environment in which a user is at least partly responsible for managing generation, configuration, or state of an underlying execution environment in addition executing desired code in the environment. One skilled in the art will thus appreciate that "serverless" and "server-based" may indicate the degree of user control over execution environments in which code is executed, rather than the actual absence or presence of a server.

As described in more detail below, the on-demand code execution system may include a job execution manager configured to receive user code (threads, programs, etc., composed in any of a variety of programming languages) and a worker to execute the code in a highly scalable, low latency manner, without requiring user configuration of a virtual machine instance. Specifically, the job execution manager can, prior to receiving the user code and prior to receiving any information from a user regarding any particular virtual machine instance configuration, create and configure virtual machine instances according to a predetermined set of configurations, each corresponding to any one or more of a variety of run-time environments. Thereafter, the job execution manager receives user-initiated requests to execute code, and identifies a pre-configured virtual machine instance to execute the code based on configuration information associated with the request. The job execution manager can further allocate the identified virtual machine instance to execute the user's code at least partly by creating and configuring containers inside the allocated virtual machine instance, and provisioning the containers with code of the task as well as dependency code objects.

As used herein, the term "virtual machine instance" is intended to refer to an execution of software or other executable code that emulates hardware to provide an environment or platform on which software may execute (an "execution environment"). Virtual machine instances are generally executed by hardware devices, which may differ from the physical hardware emulated by the virtual machine instance. For example, a virtual machine may emulate a first type of processor and memory while being executed on a second type or processor and memory. Thus, virtual machines can be utilized to execute software intended for a first execution environment (e.g., a first operating system) on a physical device that is executing a second execution environment (e.g., a second operating system). In some instances, hardware emulated by a virtual machine instance may be the same or similar to hardware of an underlying device. For example, a device with a first type of processor may implement a plurality of virtual machine instances, each emulating an instance of that first type of processor. Thus, virtual machine instances can be used to divide a device into a number of logical sub-devices (each referred to as a "virtual machine instance").

While virtual machine instances can generally provide a level of abstraction away from the hardware of an underlying physical device, this abstraction is not required. For example, assume a device implements a plurality of virtual machine instances, each of which emulate hardware identical to that provided by the device. Under such a scenario, each virtual machine instance may allow a software application to execute code on the underlying hardware without translation, while maintaining a logical separation between software applications running on other virtual machine instances. This process, which is generally referred to as "native execution," may be utilized to increase the speed or performance of virtual machine instances. Other techniques that allow direct utilization of underlying of underlying hardware, such as hardware-pass through techniques, may be used as well.

While a virtual machine executing an operating system is described herein as one example of an execution environment, other execution environments are also possible. For example, tasks or other processes may be executed within a software "container," which provides a runtime environment without itself providing virtualization of hardware. Containers may be implemented within virtual machines to provide additional security, or may be run outside of a virtual machine instance.

FIG. 1 is a block diagram of an illustrative operating environment 100 in which an on-demand code execution system 120 may operate based on communication with user computing devices 110. In general, the user computing devices 110 can be any computing device such as a desktop, laptop or tablet computer, personal computer, wearable computer, server, personal digital assistant (PDA), hybrid PDA/mobile phone, mobile phone, electronic book reader, set-top box, voice command device, camera, digital media player, and the like. The on-demand code execution system 120 may provide the user computing devices 110 with one or more user interfaces, command-line interfaces (CLIs), application programming interfaces (APIs), and/or other programmatic interfaces for generating and uploading user-executable code (including metadata identifying dependency code objects for the uploaded code), invoking the user-provided code (e.g., submitting a request to execute the user code on the on-demand code execution system 110), scheduling event-based jobs or timed jobs, tracking the user-provided code, and/or viewing other logging or monitoring information related to their requests and/or user code. Although one or more embodiments may be described herein as using a user interface, it should be appreciated that such embodiments may, additionally or alternatively, use any CLIs, APIs, or other programmatic interfaces.

The user computing devices 110 may communicate with the on-demand code execution system 110 via a network 104, which may include any wired network, wireless network, or combination thereof. For example, the network 104 may be a personal area network, local area network, wide area network, over-the-air broadcast network (e.g., for radio or television), cable network, satellite network, cellular telephone network, or combination thereof. As a further example, the network 104 may be a publicly accessible network of linked networks, possibly operated by various distinct parties, such as the Internet. In some embodiments, the network 104 may be a private or semi-private network, such as a corporate or university intranet.

The network 104 may include one or more wireless networks, such as a Global System for Mobile Communications (GSM) network, a Code Division Multiple Access (CDMA) network, a Long Term Evolution (LTE) network, or any other type of wireless network. The network 104 can use protocols and components for communicating via the Internet or any of the other aforementioned types of networks. For example, the protocols used by the network 104 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

The on-demand code execution system 120 is depicted in FIG. 1 as operating in a distributed computing environment including several computer systems that are interconnected using one or more computer networks (not shown in FIG. 1). The on-demand code execution system 120 could also operate within a computing environment having a fewer or greater number of devices than are illustrated in FIG. 1. Thus, the depiction of the on-demand code execution system 120 in FIG. 1 should be taken as illustrative and not limiting to the present disclosure. For example, the on-demand code execution system 120 or various constituents thereof could implement various Web services components, hosted or "cloud" computing environments, and/or peer to peer network configurations to implement at least a portion of the processes described herein.

Further, the on-demand code execution system 120 may be implemented directly in hardware or software executed by hardware devices and may, for instance, include one or more physical or virtual servers implemented on physical computer hardware configured to execute computer executable instructions for performing various features that will be described herein. The one or more servers may be geographically dispersed or geographically co-located, for instance, in one or more data centers. In some instances, the one or more servers may operate as part of a system of rapidly provisioned and released computing resources, often referred to as a "cloud computing environment."

In FIG. 1, users, by way of user devices 110, may interact with the on-demand code execution system 120 to provide source code, and establish rules or logic defining when and how such code should be executed on the on-demand code execution system 120, thus establishing a "task" or "function." For example, a user may wish to run a piece of code in connection with a web or mobile application that the user has developed. One way of running the code would be to acquire virtual machine instances from service providers who provide infrastructure as a service, configure the virtual machine instances to suit the user's needs, and use the configured virtual machine instances to run the code. In order to avoid the complexity of this process, the user may alternatively provide the code to the on-demand code execution system 120, and request that the on-demand code execution system 120 execute the code using one or more execution environments that are managed by the on-demand code execution system 120.

The on-demand code execution system 120 can handle the acquisition and configuration of compute capacity (e.g., containers, instances, etc., which are described in greater detail below) based on the code execution request, and execute the code using the compute capacity. The on-demand code execution system 120 may automatically scale up and down based on the volume of request to execute code, thereby relieving the user from the burden of having to worry about over-utilization (e.g., acquiring too little computing resources and suffering performance issues) or under-utilization (e.g., acquiring more computing resources than necessary to run the code, and thus overpaying).

To enable interaction with the on-demand code execution system 120, the on-demand code execution system 120 includes multiple frontends 130, which enable interaction with the on-demand code execution system 120. In an illustrative embodiment, the frontends 130 serve as a "front door" to the other services provided by the on-demand code execution system 120, enabling users (via user devices 110) to provide, request execution of, and view results of computer executable source code. The frontends 130 include a variety of components to enable interaction between the on-demand code execution system 120 and other computing devices. For example, each frontend 130 may include a request interface providing user devices 110 with the ability to upload or otherwise communication user-specified code and associated data sets to the on-demand code execution system 120 (e.g., in the form of a disk image) and to thereafter request execution of that code. In one embodiment, the request interface communicates with external computing devices (e.g., user devices 110, etc.) via a graphical user interface (GUI), CLI, or API. The frontends 130 process the requests and makes sure that the requests are properly authorized. For example, the frontends 130 may determine whether the user associated with request is authorized to access the source code specified in the request.

References to user code as used herein may refer to any program code (e.g., a program, routine, subroutine, thread, etc.) written in a specific program language. In the present disclosure, the terms "code," "user code," "function code," and "program code," may be used interchangeably. Such user code may be executed to achieve a specific function, for example, in connection with a particular data transformation developed by the user. As noted above, individual collections of user code (e.g., to achieve a specific function) are referred to herein as "tasks" (or "jobs"), while specific executions of that code (including, e.g., compiling code, interpreting code, or otherwise making the code executable) are referred to as "task executions" (or "job executions") or simply "executions." Tasks may be written, by way of non-limiting example, in JavaScript (e.g., node.js), Java, Python, or Ruby (or another programming language).

Prior to calling for execution of a function, an end user may submit (e.g., to a frontend 130) code for the function and associated data to be used to execute the function. In one embodiment, the code is provided in the form of a disk image containing the code and other data that the code may use during execution. Illustratively, creation of a function may result in the frontend 130 creating metadata for the function, which defines for example the user creating the function, the disk image used to facilitate execution of the function, trigger conditions for the function, and the like. In one embodiment, functions may be versioned, with function metadata identifying the available versions and at least some other metadata for a function may vary across versions. For example, different versions may be associated with different disk images. Function data and metadata is illustratively stored in a function data store. The function data store corresponds to any persistent data store. In one embodiment, the function data store is implemented as logical storage on a cloud storage service, such as an object storage system.

After a user has created a function on on-demand code execution system 120, the on-demand code execution system 120 may accept calls to execute that function, which may also be referred to as "function invocations." To handle calls to execute a function, the frontend 130 can include an execution queue, which can maintain a record of requested task executions. Illustratively, the number of simultaneous function executions by the on-demand code execution system 120 is limited, and as such, new function executions initiated at the on-demand code execution system 120 (e.g., via an API call, via a call from an executed or executing function, etc.) may be placed on the execution queue and processed, e.g., in a first-in-first-out order.

In some embodiments, the on-demand code execution system 120 may include multiple execution queues, such as individual execution queues for each user account. For example, users of the serverless code execution on-demand code execution system 120 may desire to limit the rate of function executions on the s on-demand code execution system 120 (e.g., for cost reasons). Thus, the on-demand code execution system 120 may utilize an account-specific execution queue to throttle the rate of simultaneous function executions by a specific user account. In some instances, the on-demand code execution system 120 may prioritize function executions, such that function executions of specific accounts or of specified priorities bypass or are prioritized within the execution queue. In other instances, the on-demand code execution system 120 may execute functions immediately or substantially immediately after receiving a call for that function, and thus, the execution queue may be omitted.

In addition to functions executed based on explicit user calls, the on-demand code execution system 120 may in some instances operate to trigger execution of functions independently. For example, the on-demand code execution system 120 may operate (based on instructions from a user) to trigger execution of a function at each of a number of specified time intervals (e.g., every 10 minutes).

The frontend 130 can further includes an output interface configured to output information regarding the execution of functions on the on-demand code execution system 120. Illustratively, the output interface may transmit data regarding function executions (e.g., results of a function, errors related to the function execution, or details of the function execution, such as total time required to complete the execution, total data processed via the execution, etc.) to the user device 110, which may include, for example, billing or logging services. Code executions triggered on the on-demand code execution system 120 of FIG. 1 are managed by the job execution manager 160 and executed by execution environments hosted by a set of workers 142 within a worker fleet 140.

The on-demand code execution system 120 includes a job execution manager 160 configured to manage execution environments (e.g., virtual machine instances) hosted by workers 142 among the worker fleet 140. Further the job execution manager 160 may also manage job execution in each of the virtual machine instances associated with the workers 142. For example, the job execution manager 160 may be one of a number of components for facilitating distribution of calls to execute a function from frontends 120 to particular virtual machine instances 150.

The job execution manager 160 illustratively implemented as physical or virtual-on-physical devices, illustratively "lease" particular virtual machine instances 150 within the worker fleet 140, thus gaining operational control to, for example, instruct virtual machine instances 150 to execute code of the function. Thus, on receiving a call to execute a function, a frontend 130 may distribute the call to a job execution manager 160, which may identify a currently-leased virtual machine instance in which to implement the function, and cause the virtual machine instance 150 to implement the function.

The job execution manager 160 may also have access to a machine learning store 170 (which can store all types of machine learning models, such as classification type machine learning model(s), regression type machine learning model(s), support vector machines (SVM) machine learning model(s), ensemble method machine learning model(s), neural network model(s), deep learning model(s), or (large) language model(s)). The job execution manager 160 may use the machine learning models in the machine learning store 170 to predict runtimes for each task received from the frontend 130 (as described infra).

Once a triggering event to execute a task has been successfully processed by a frontend 130, the frontend 130 passes a request to the job execution manager 160 to facilitate execution of the task. In turn, based on the attributes (e.g., metadata) of the request, the job execution manager 160 may determine a worker 142, a virtual machine instance, or a container to have the task be executed. Various other mechanisms for distributing calls workers 142, virtual machine instances, or containers will be apparent to one of skill in the art.

Each worker 142 is illustratively a host device configured to host multiple execution environments, which in FIG. 1 are virtual machine instances 150 that include at least one of a virtual machine instance 150A and a virtual machine instance 150B. Execution environments may alternatively include software containers, sometimes referred to as "OS-level virtualization," another virtualization technology known in the art. Thus, where references are made herein to virtual machine instances 150, it should be understood that (unless indication is made to the contrary) a container/may be substituted for such instances 183.

As shown in FIG. 1, each worker 142 may host a number of virtual machine instances 150 (e.g., virtual machine instance 150A and virtual machine instance 150B). Each virtual machine instance 150 may be isolated from other virtual machine instances 150 (e.g., virtual machine instance 150A is isolated from virtual machine instance 150B), thus ensuring the security of code executions on the on-demand code execution system 120. For example, each virtual machine instance 150 may be divided by a virtualization boundary, by virtue of the virtual machine instance 150 being a virtual machine hosted by the worker 142. In addition, each virtual machine instance 150 may exist within a partitioned user space on the worker 142, which logically partitions resources of the worker 142 among virtual machine instance 150.

At least one of the virtual machine instances 150 may further implement one or more containers 156A-156N (with "N" representing the last container when a maximum number of containers has been created), which may contain and execute one or more user-submitted codes 158A-158N (with "N" representing the last user code in the last container when a maximum number of containers has been created). Containers are logical units created within a virtual machine instance, or on a host computing device, using the resources available on that instance or device. For example, each job execution manager 160 may, based on information specified in a call to execute a task, create a new container or locate an existing container out of the containers 156A-156N and assign the container to handle the execution of the task. Each container may correspond to an execution environment for the task, providing at least some isolation from other execution environments. For example, each container may provide a file system isolated from other file systems on the device, and code executing in the container may have limited or no access to other file systems or memory space associated with code executing outside of the container. The containers 156A-156N and virtual machine instances 150 may further include language runtimes, code libraries, or other supporting functions (not depicted in FIG. 1) that facilitate execution of user-submitted codes 154 and 158A-158N. The virtual machine instances 150A and 150B may further include operating systems 152A and 152B, respectively. In various embodiments, operating systems 152A and 152B may be the same operating system, variants of the same operating system, different operating systems, or combinations thereof.

To facilitate rapid execution of code, each worker 142 may be configured to maintain a set of virtual machine instances 150 in a "pre-warmed" state, being at least partially configured to begin execution of code. For example, virtual machine instances may be created on the worker and configured with access to computing resources (CPU, RAM, drive storage, etc.). In some cases, it may be impractical or impossible to maintain virtual machine instances 150 in a fully warmed state for all possible code executions, as executions may be associated with a wide variety of at least partially distinct data sets (e.g., disk images and/or snapshots). Thus, virtual machine instances 150 may be maintained in a "greatest commonality" for a given group of tasks, such as being provisioned with a set of computing resources common to those tasks, being configured to accept an operating system type used by those tasks, etc.

On receiving instructions (e.g., from the job execution manager 160) to provision a virtual machine instance 150 to support execution of the task, the worker 142 may adjust the configuration of the virtual machine instance 150 to support that execution. Specifically, the worker 142 may provision the virtual machine instance 150 with access to a disk image or snapshot corresponding to the task. In some instances, the worker 142 may retrieve the disk image for the task and store the full image locally. In other instances, the worker 142 may provide to a virtual machine instance 150 what appears to be full local access to the disk image or snapshot, while "lazily" retrieving portions of that image or snapshot in response to a request to read such portions.

Example Routine for Executing Job on On-Demand Code Execution System.

Figure 8:
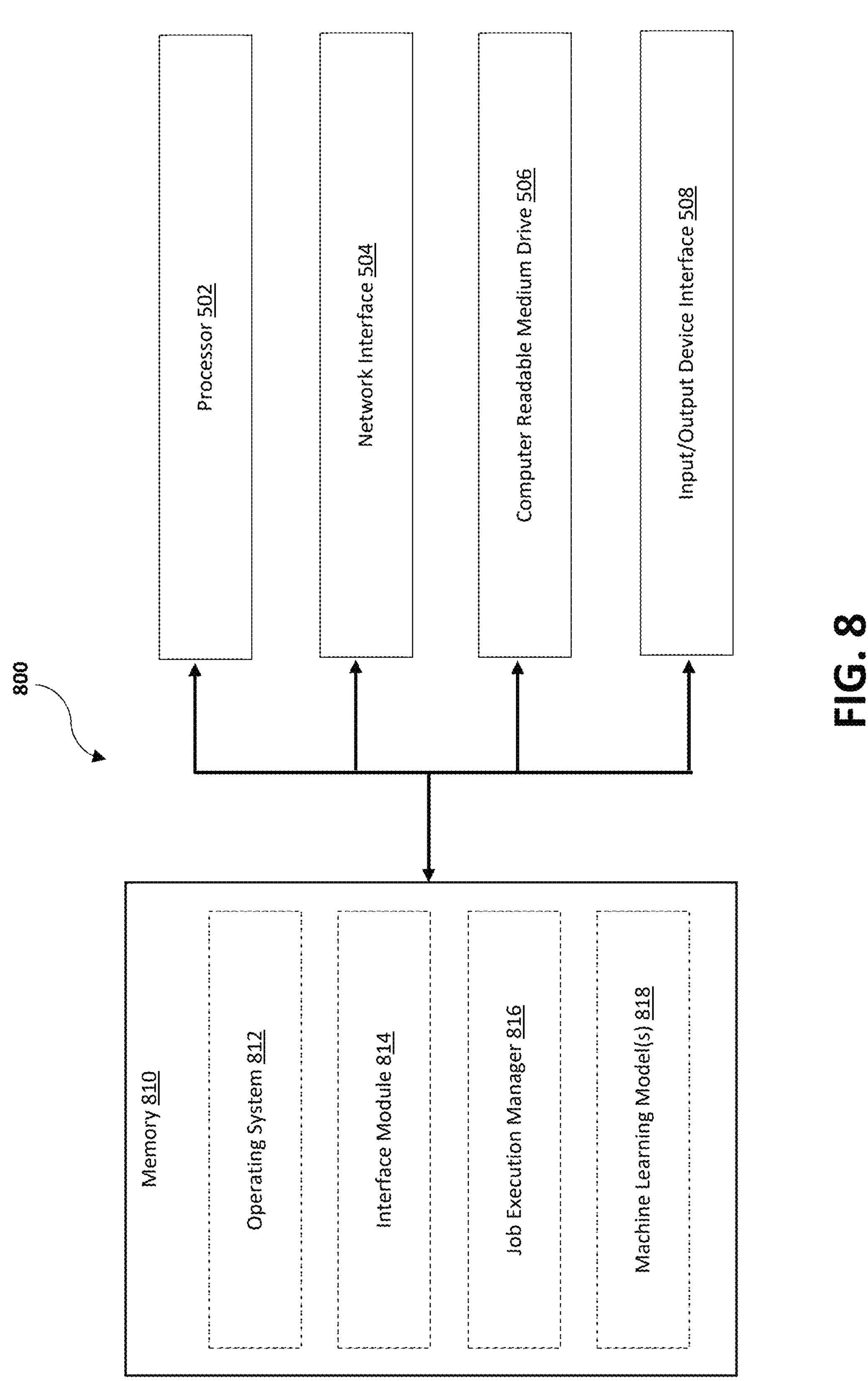
FIG. 8 depicts a general architecture of a computing device providing the job execution manager as depicted in FIG. 1.

When a routine described herein (i.e., 200, 500, 600, 700) is initiated, as set of executable program instructions stored on one or more non-transitory computer-readable media (e.g., hard drive, flash memory, removable media, etc.) may be loaded into memory (e.g., random access memory or RAM) of a computing device, such as the computing device 800 shown in FIG. 8, and executed by one or more processors. In some embodiments, the routine 200, 500, 600, 700), or portions thereof may be implemented on multiple processors, serially or in parallel.

Figure 2:
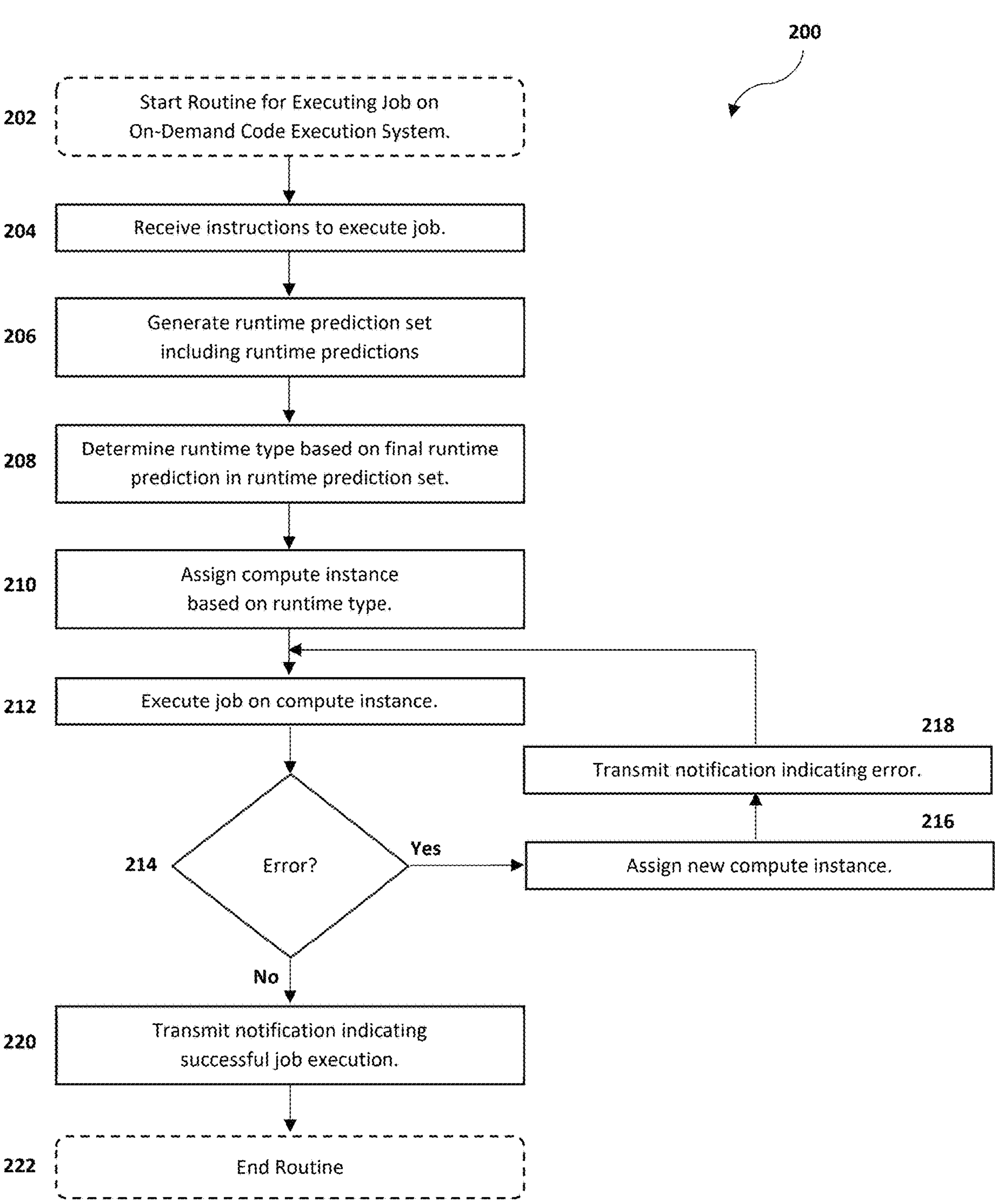
FIG. 2 is a flow diagram of a computerized method for executing a job on an on-demand code execution system in accordance with aspects of the present disclosure.

FIG. 2 illustrates example routine 200 (beginning at block 202) for executing jobs on an on-demand code execution system, that is performed, for example, by the job execution manager 160. At block 204, the job execution manager 160 receives instructions to execute a job. As discussed previously, a user device or a software application may submit a request to execute code(s) (e.g., in the form of a task or job) in on the on-demand code execution system 120. It should be noted that the job execution manager 160 may also receive instructions to execute a batch job, which includes two or more jobs that are to be executed together (e.g., in parallel or in sequence). In some embodiments, each job in a batch job is executed without having any other jobs (not part of the batch job) being executed in-between executions of the jobs in the batch job. Batch jobs may include generating reports, data conversions, etc. As such, it should be noted that the routine 200 (e.g., and each of the corresponding blocks from 204 to block 222) may also process batch jobs as well. Once the frontend 130 receives the request, the frontend 130 transmits the request to the job execution manager 160 to facilitate execution of the job. In addition, the frontend 130 may also transmit metadata that is associated with the job to the job execution manager 160 as well.

Examples of metadata include execution type, data size, file size, and job identifier. The execution type of a job may be the type of action that describes the job. For example, the execution type may include transmitting data (e.g., file transfer (downloading, uploading), loading files (e.g., loading local files on the user device), sending emails and text messages, streaming videos, generating user interfaces, calling a function associated with Structured Query Language (SQL), etc. The data size of a job may be associated with the amount of resources (e.g., processing and/or memory resources) that a job consumes. For example, executing a job may involve using a processor for a specific amount of time or using a particular amount of memory (e.g., volatile and non-volatile data storage). The file size of a job may be associated with the size of a file that is being processed or generated by the job. For example, the file may include at least one of text files, images, data files, etc. A job identifier may be a unique identifier associated with the job. In some embodiments, the frontend 130 generates the job identifier for each job received.

At block 206, the job execution manager 160 generates a runtime prediction set that includes two or more runtime predictions. A runtime (e.g., associated with the job) may be the length of time a job consumes when being executed, for example, on the on-demand code execution system 120 (e.g., from the start of executing the job to the expected completion of the job). In some embodiments, a runtime prediction in the runtime prediction set may be a forecast of the runtime of the job (e.g., a prediction of how long the job is expected to execute). In some embodiments, the runtime and the runtime prediction may be a numerical value that represents a period of time (e.g., microseconds, milliseconds, seconds, minutes, hours, days, weeks, months, years, etc.).

To generate the runtime prediction set, the job executing manager 160 may use two or more machine learning models. More specifically, the job executing manager 160 may have access to machine learning models stored in the machine learning store 170. The job executing manager 160 may request a machine learning model for each runtime prediction to be generated. For example, the job executing manager 160 may be configured to generate a runtime prediction from two or more prespecified machine learning models. Each of the machine learning models may generate a runtime prediction based on the metadata of the job (e.g., execution type, data size, file size, job identifier). In some embodiments, a single machine learning model generates a single runtime prediction. In some embodiments, the machine learning models include at least one of includes at least one of Neural Basis Expansion Analysis with Exogenous Variables (NBEATSx), Neural Hierarchical Interpolation for Time Series Forecasting (N-HITS), Extreme Gradient Boosting (XGBoost), and Light Gradient Boosting Machine (LightGBM).

At block 208, the job execution manager 160 determines a runtime type based on the final runtime prediction in the runtime prediction set. As discussed previously, the machine learning models may generate corresponding runtime predictions that are included in a runtime prediction set. From such runtime prediction set, the job execution manager 160 determines a final runtime prediction which, in turn, determines the runtime type. In some embodiments, the job execution manager 160 determines the final runtime prediction based on the averages of the runtime predictions in the runtime prediction set.

For example, as illustrated in the table of FIG. 3A, there is a runtime prediction set A (including runtime predictions 1A, 2A, 3A, 4A, and 5A) that was generated via five machine learning models: machine learning model A, machine learning model B, machine learning model C, machine learning model D, and machine learning model E. Each of the machine learning models A, B, C, D, and E may be different from each other. In the table, each of the machine learning models has generated a runtime prediction (i.e., machine learning model A: 10 seconds; machine learning model B: 11 seconds; machine learning model C: 12 seconds; machine learning model D: 9 seconds; machine learning model E: 6 seconds). The table further indicates that the final runtime prediction is the average of the runtime predictions in the runtime prediction set (i.e., final runtime prediction A: 9.6 seconds).

Figure 4:
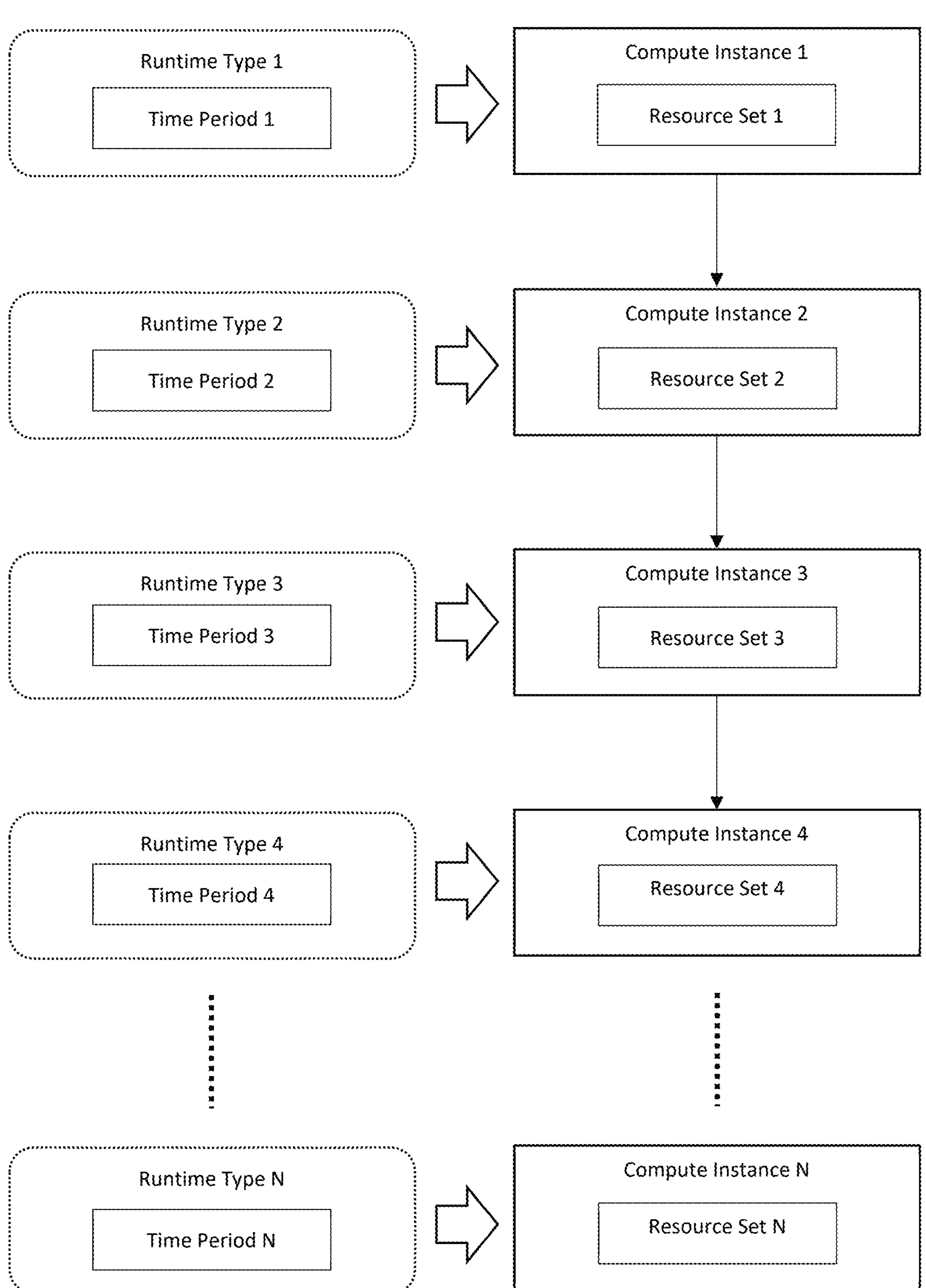
FIG. 4 is an example diagram that illustrates the relationship between the runtime types (including their corresponding time periods) and compute instances (including their corresponding resource sets).

In other embodiments, the job execution manager 160 determines the runtime prediction that is associated with the longest runtime in such runtime prediction set. For example, as illustrated in the table of FIG. 4B, there is a runtime prediction set B (including runtime predictions 1B, 2B, 3B, and 4B) that was generated via four machine learning models: machine learning model F, machine learning model G, machine learning model H, machine learning model I. In some embodiments, each of the machine learning models F, G, H, and I may be different from each other. In some embodiments, one or more of the machine learnings models F, G, H, and I may be the same as one or more of the machine learning models A, B, C, D and E.

In the table, each of the machine learning models has generated a runtime prediction (i.e., machine learning model F: 13 minutes; machine learning model G: 16 minutes; machine learning model H: 15 minutes; machine learning model I: 16 minutes). The table further indicates that the final runtime prediction is the longest runtime prediction of the runtime predictions in the runtime prediction set (i.e., final runtime prediction A: 16 minutes). It should be noted that the table in FIG. 3B indicates that two machine learning models (i.e., machine learning model G and machine learning model I) generated the same runtime prediction, which also happens to be the longest runtime prediction of the runtime prediction set B (i.e., 16 minutes). In other words, it may not matter which machine learning model generated the longest runtime prediction (final runtime prediction), since the numerical value of the final runtime prediction is used in determining the runtime type.

After determining the final runtime prediction, the job execution manager 160 determines the runtime type associated with the job. More specifically, there may be two or more runtime types from which the job execution manager 160 can select. Each runtime type may be associated with a predetermined time period. As such, runtime type is assigned to a job based on the final runtime prediction that falls within the predetermined period of that runtime type. For example, a particular runtime type may be associated with a predetermined time period of zero to ten minutes. Therefore, any job having a final runtime prediction that is ten minutes or less is assigned that particular runtime.

In some embodiments, there may be a first runtime type, a second runtime type, and a third runtime type. The first runtime type may be assigned to the job when the longest predicted runtime (or average predicted runtime) of the runtime prediction set is greater or equal to zero and less than five minutes (time period of the first runtime type). The second runtime type may be assigned to the job when the longest predicted runtime (or average predicted runtime) of the runtime prediction set is greater than or equal to five minutes and less than fifteen minutes (time period of the second runtime type). The third runtime type may be assigned to the job when the longest predicted runtime (or average predicted runtime) of the runtime prediction set is greater than or equal to fifteen minutes (time period of the third runtime type). It should be noted that the runtime types are not limited to the aforementioned first, second, and third runtime types. There may be more runtime types having different time periods.

At block 210, the job execution manager 160 assigns a compute instance based on the runtime type. The compute instance may be a virtual machine instance (e.g., VM instance 150A, VM instance 150B) in a serverless environment or a container within the virtual machine instance (e.g., containers 156A-156N) in a container environment. As shown in the example illustrated in FIG. 4, each runtime type (e.g., runtime type 1, runtime type 2, . . . , runtime type N; where N is an integer or natural number) may be associated with a specific time period (e.g., time period 1, time period 2, . . . , time period N; where N is an integer or natural number). Further, each time period of the runtime types is different from each other. More specifically, the runtime types may be arranged sequentially (in terms of length of time period), such that the time periods associated with the runtime types increases with each subsequent runtime type (e.g., time period 2 is longer than time period 1, and time period 3 is longer than time period 2).

Further, each runtime type is associated with a corresponding compute instance (e.g., compute instance 1, compute instance 2, . . . , compute instance N; where N is an integer or natural number). Similarly, the compute instances may be arranged sequentially (in terms of size of resource set), such that the resource sets (e.g., resource set 1, resource set 2, . . . , resource set N, where N is an integer or natural number) associated with the compute instances increases with each subsequent resources (e.g., resources 2 is larger than resources 1, and resources 3 is larger than resources 2). It should be noted that the resource sets may include one or more resources such as memory (e.g., amount of volatile storage, such as random-access memory (RAM), allocated to container), the processing power (e.g., processing power allocated to the container), storage (e.g., the amount of non-volatile storage allocated to the container), and time (e.g., the maximum amount of time allocated to a job).

As such, runtime types having a relatively short time period (e.g., runtime type 1) are associated with compute instances that have smaller amount of resources (e.g., resource set 1), while runtime types having a relatively longer time period (e.g., runtime type 3) are associated with compute instances that have a greater amount of resources (e.g., resource set N). In some embodiments, one or more of the compute instances 1, 2, 3, . . . , N may include containers in a container environment (e.g., containers 156A-156N). In some embodiments, containers may be specifically included as one or more of the compute instances to execute batch jobs (since batch jobs tend to consume more resources than smaller non-batch jobs).

At block 210, the job execution manager 160 causes the job to be executed on the compute instance. For example, the job execution manager 160 may transmit a job execution instruction (e.g., having the code associated with job therein) to a specific worker 142 (that is managing the virtual machine instance or container that is selected for executing the job) to have the specific worker 142 execute the job on the assigned compute instance. At block 214, the job execution manager 160 determines whether an error has occurred in the job execution. For example, the job execution manager may determine that an error has occurred when the job executes longer than the associated final runtime prediction (and "times out"). An error may occur due to a variety of reasons. For example, there may be an error due to resource limitations (e.g., insufficient memory in the compute instance to execute the job), in which the job may exceed the allocated resources (e.g., time, memory or processing power). More specifically, the job execution manager 160 may have incorrectly generated the final runtime prediction (e.g., the final runtime prediction should have been much longer, such as 30 minutes vs. 15 minutes). Therefore, there were resource limitations in executing the job. In another example, there may be issues with the network connectivity or latency that caused an error in the job execution. In a further example, the errors may be failure in portions of the on-demand code execution system (e.g., temporary service outages (of the on-demand code execution system 120) that occur during job execution). In yet a further example, there may be failure to load data into the compute instance or insufficient memory in the compute instance to load data into.

In case that the job execution manager 160 detects an error (block 214, yes), the job execution manager 160 assigns a new compute instance at block 216. In other words, the job execution manager 160 attempts to retry executing the job on a compute instance that is different from the compute instance originally assigned to the job. In some embodiments, the job execution manager 160 may immediately attempt to retry executing the job on a new compute instance (e.g., no waiting time, such as exponential backoff) thereby optimizing job execution. The job execution manager 160 determines the new compute instance based on the compute instance originally assigned to the job. In some embodiments, the new compute instance may be the next immediate largest compute instance (in terms of the amount of resources in the corresponding resource set). For example, with reference to the illustration of FIG. 4, in case that the original compute instance was compute instance 2, the next immediately largest compute instance is compute instance 3. As such, the job execution manager 160 may assign compute instance 3 as the new compute instance.

After being assigned a new compute instance, the job execution manager 160 may transmit a notification indicating the error in job execution, at block 218. In some embodiments, the job execution manager 160 may maintain a log of events (e.g., a historical list of successful or unsuccessful job executions). More specifically, a message or log entry is recorded for each such event. These log messages can then be used to monitor and understand the operation of the system, to debug problems, or during an audit. Such log messages may be written to a log file, where the log file may be stored in a database. As such, when a job execution error has occurred, the job execution manager 160 may generate a notification that includes information regarding the job execution, which may include the job, the error encountered, the time and date of the attempted execution, etc. Then, the job execution manager 160 may transmit such notification to be written in the log file in, for example, a database. It should be noted that there may be a single log file that includes all of the job that have been successfully and unsuccessfully executed. In the alternative, there may be a log file for jobs that have been executed successfully and a log file for jobs that have not executed successfully.

In other embodiments, the job execution manager 160 may transmit a message (e.g., via email or short message (SMS)) to at least one of a user of the user device 110 or an administrator managing the on-demand code execution system 160 to inform them that an error has occurred. For example, the message may include information regarding the job execution, which may include the job, the error encountered, the time and date of the attempted execution, etc. In another example, the job execution manager 160 may transmit an updated log file at predetermined time intervals. Consequently, by transmitting such notification indicating the error, the error can be analyzed to prevent it from happening again.

After transmitting the notification indicating the job execution error, the routine 200 moves back to block 212 in order to execute the job again. It should be noted that the cycle involving block 212, block 214, block 216, and block 218 may continue until the job executes successfully or there are no more compute instances left to execute the job. With reference to the example illustrated in FIG. 4, in case that the job was originally assigned compute instance 2, the new compute instance would be compute instance 3. In case the job fails to execute on compute instance 3, then the new compute instance would be compute instance 4. This process may continue until the attempted execution of the job on compute instance N. In case that the job fails to execute the job on compute instance N, the job execution manager 160 may transmit a notification indicating that the job was not able to execute on any of the compute instances 1, 2, 3, . . . , N.

In case that the job execution manager 160 does not detect an error (block 214, no), the routine 200 moves to block 220. For example, the lack of an error may indicate that the job was executed successfully (e.g., with no issues or problems). At block 220, the job execution manager 160 may transmit a notification indicating the successful job execution. As discussed previously, in some embodiments, the job execution manager 160 may maintain a log of events (e.g., a historical list of successful or unsuccessful job executions), in which a message or log entry is recorded for each such event. As such, when a job is successfully executed, the job execution manager 160 may generate a notification that includes information regarding the job execution, which may include the job, the time and date of the execution, the length of time associated with executing the job (e.g., from start to finish) etc. Then, the job execution manager 160 may transmit such notification to be written in the log file in, for example, a database.

In other embodiments, the job execution manager 160 may transmit a message (e.g., via email or short message (SMS)) to at least one of a user of the user device 110 or an administrator managing the on-demand code execution system 160 to inform them that the job has executed successfully. For example, the message may include information regarding the job execution, which may include the job, the time and date of the execution, the length of time associated with executing the job (e.g., from start to finish) etc. In another example, the job execution manager 160 may transmit an updated log file at predetermined time intervals. The routine ends at block 222.

Example Routine for Executing Job Initially Assigned to Serverless Environment

When a routine described herein (i.e., 200, 500, 600, 700) is initiated, as set of executable program instructions stored on one or more non-transitory computer-readable media (e.g., hard drive, flash memory, removable media, etc.) may be loaded into memory (e.g., random access memory or RAM) of a computing device, such as the computing device 800 shown in FIG. 8, and executed by one or more processors. In some embodiments, the routine 200, 500, 600, 700), or portions thereof may be implemented on multiple processors, serially or in parallel.

Figure 5:
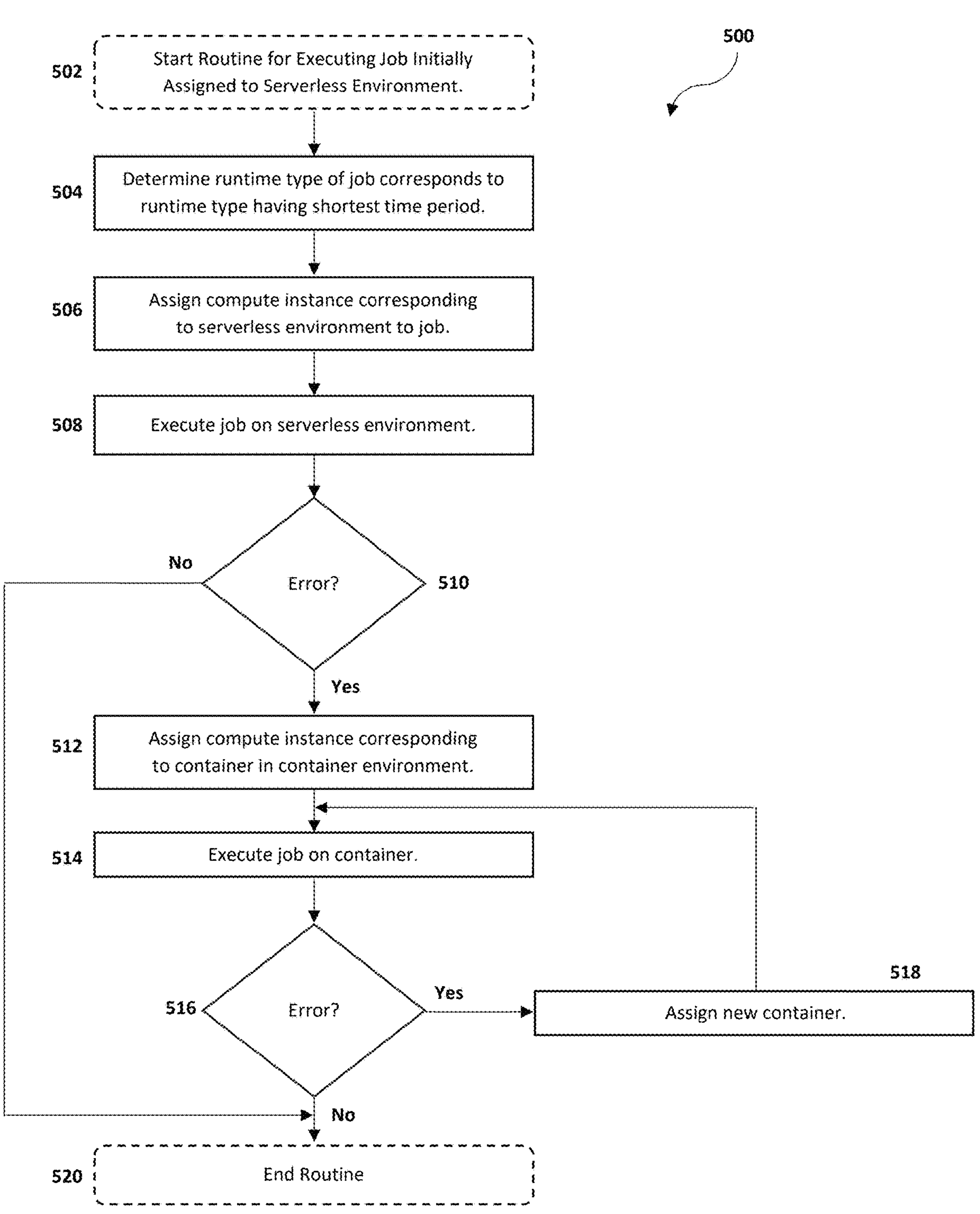
FIG. 5 is a flow diagram of a computerized method for executing job initially assigned to serverless environment in accordance with aspects of the present disclosure.

FIG. 5 illustrates example routine 500 (beginning at block 502) for executing a job initially assigned to a serverless environment, that is performed, for example, by the job execution manager 160. At block 504, the job execution manager 160 determines that runtime type of the job corresponds to runtime type having the shortest time period. As discussed previously, a user device or a software application may submit a request to execute code(s) (e.g., in the form of a task or job) in the on-demand code execution system 120. In some embodiments, the job may correspond to a batch job. As such, it should be noted that the routine 500 (e.g., and each of the corresponding blocks from 504 to block 520) may also process batch jobs as well. As previously described with respect to block 208 of routine 200 in FIG. 2, the job execution manager 160 may determine a runtime type associated with the job based on a final runtime prediction in a runtime prediction set generated by the corresponding machine learning models. In the present case, the runtime type associated with the job may correspond to the runtime type having the shortest time period. In other words, the final runtime prediction of the runtime prediction set may fall within the time period of the runtime type having the shortest time period.

At block 506, the job execution manager 160 assigns a compute instance corresponding to a serverless environment to the job. As discussed previously, the compute instance may be a virtual machine instance (e.g., VM instance 150A, VM instance 150B) in a serverless environment. It should be noted that assigning a serverless environment to execute the job may be advantageous because serverless environments allow rapid scaling and automatic resource allocation which often results in faster execution time for the job. In some cases, executing a job on a serverless environment is quicker than executing a job on a container. Nevertheless, in some embodiments, the on-demand code execution system 120 may restrict the amount of resources (e.g., time, processing, memory) involved in executing the job in a serverless environment. As such, the jobs having short runtimes (e.g., less than 5 minutes) may benefit the most from being executed in a serverless environment.

At block 508, the job execution manager 160 causes the job to be executed on the compute instance. For example, the job execution manager 160 may transmit a job execution instruction (e.g., having the code associated with job therein) to a specific worker 142 (that is managing the virtual machine instance or container that is selected for executing the job) to have the specific worker 142 execute the job in the serverless environment. At block 510, the job execution manager 160 determines whether an error has occurred in the job execution. An error may occur due to a variety of reasons. For example, there may be an error due to resource limitations, in which the job may exceed the allocated resources (e.g., memory or processor). More specifically, the job execution manager 160 may have incorrectly generated the final runtime prediction (e.g., the final runtime prediction should have been much longer, such as 30 minutes vs. 15 minutes). Therefore, there were resource limitations in executing the job.

In case that the job execution manager 160 detects an error (block 510, yes), the job execution manager 160 assigns a compute instance corresponding to container in container environment, at block 512. In other words, as discussed previously, the error may result from resource limitations, in which the job may exceed the allocated resources (e.g., time, memory or processing power). As such, the job execution manager 160 may assign a container with more resources than the resources allocated in the serverless environment. For example, with reference to the illustration in FIG. 4, the compute instance 1 may correspond in this case (i.e., routine 500) to a virtual machine instance in a serverless environment and compute instances 2, 3, . . . , N may each correspond to a container, in which the size (e.g., resource set) of the container increases with each subsequent container (e.g., compute instance (container) 3 is larger than compute instance (container) 2). Further, the resource set of the compute instance (virtual machine instance in serverless environment) 1 may be less than the resource set of the compute instance (container) 2.

At block 514, the job execution manager causes the job to be executed on the container. For example, the job execution manager 160 may transmit a job execution instruction (e.g., having the code associated with job therein) to a specific worker 142 (that is managing the virtual machine instance or container that is selected for executing the job) to have the specific worker 142 execute the job on the assigned container. In some embodiments, the job execution manager 160 may transmit the job execution instruction to another workers 142 that is different from the worker 142 that was used to execute the job on the serverless environment.

At block 516, the job execution manager 160 determines whether an error has occurred in the job execution on the container. In the case that an error has occurred, the job execution manager 160 assigns a compute instance corresponding to container in container environment, at block 512. In other words, the job execution manager 160 attempts to retry executing the job on a container that is different from the container originally assigned to the job. In some embodiments, the job execution manager 160 may immediately attempt to retry executing the job on the new container (e.g., no waiting time, such as exponential backoff) thereby optimizing job execution. The job execution manager 160 determines the new container based on the container originally assigned to the job. More specifically, the new container may have a larger amount of resources (e.g., time, memory or processing power) than the amount of resources in the original container.

After assigning the new container, the routine 500 moves back to block 514 in order to execute the job again. It should be noted that the cycle involving block 514, block 516, and block 518 may continue until the job executes successfully or there are no more containers left to execute the job. With reference to the example illustrated in FIG. 4, the process of attempting jobs on a container may continue until the attempted execution of the job from compute instance (container) 2 until compute instance (container) N. In some embodiments, in case that the job fails to execute the job on compute instance N, the job execution manager 160 may transmit a notification indicating that the job was not able to execute on any of the compute instances 1, 2, 3, . . . , N.

In case that the job execution manager 160 determines that there is no error (block 510, no; block 516, no), the routine 500 moves to block 520. For example, the lack of an error may indicate that the job was executed successfully (e.g., with no issues or problems). In some embodiments, the job execution manager 160 may transmit a notification indicating the successful job execution (e.g., transmit such notification to be written in the log file in, for example, a database). The routine ends at block 520.

Example Routine for Executing Jobs in Parallel

When a routine described herein (i.e., 200, 500, 600, 700) is initiated, as set of executable program instructions stored on one or more non-transitory computer-readable media (e.g., hard drive, flash memory, removable media, etc.) may be loaded into memory (e.g., random access memory or RAM) of a computing device, such as the computing device 800 shown in FIG. 8, and executed by one or more processors. In some embodiments, the routine 200, 500, 600, 700), or portions thereof may be implemented on multiple processors, serially or in parallel.

Figure 6:
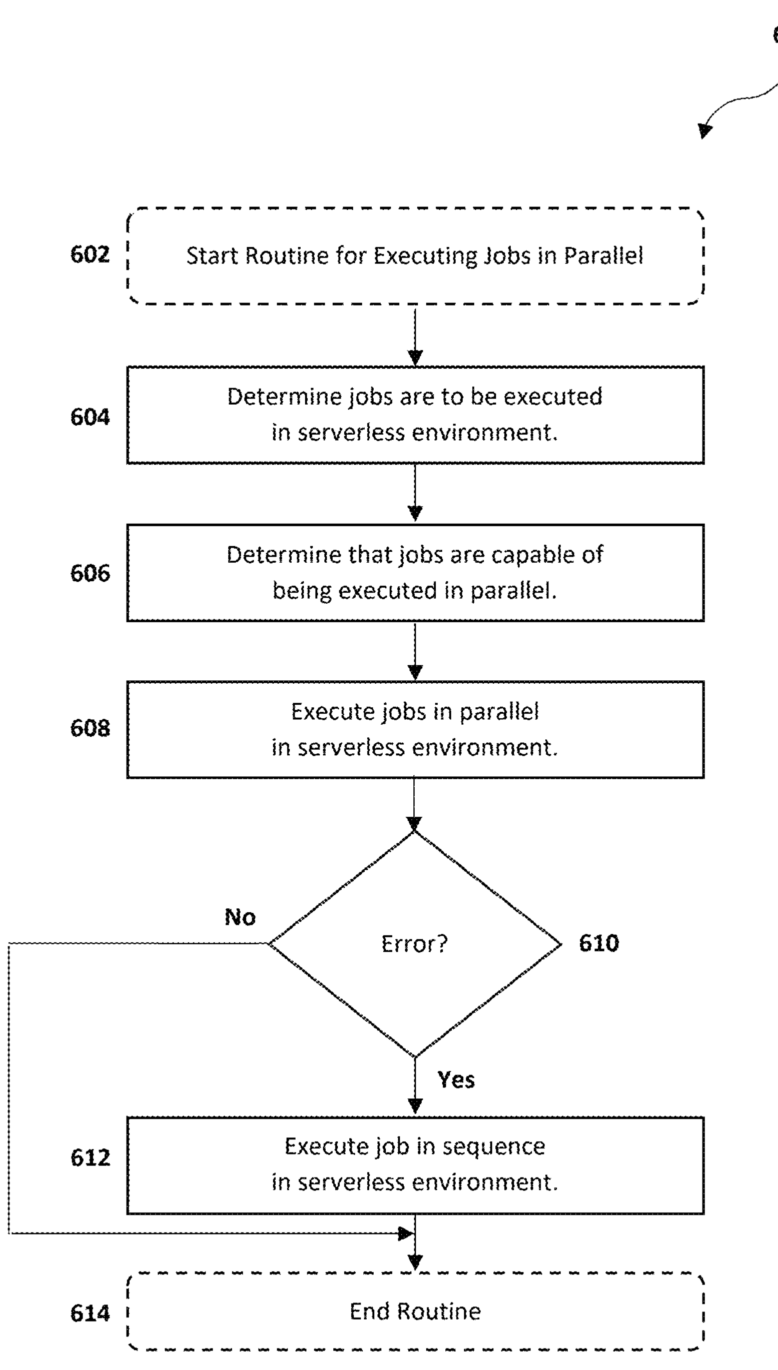
FIG. 6 is a flow diagram of a computerized method for executing jobs in parallel in accordance with aspects of the present disclosure.

FIG. 6 illustrates example routine 600 (beginning at block 602) for executing jobs in parallel that is performed, for example, by the job execution manager 160. At block 604, the job execution manager 160 determines two or more jobs are to be executed in a serverless environment. For example, the job execution manager 160 may receive many requests (to execute jobs) simultaneously or within a similar timeframe. As such, the job execution manager 160 may schedule a specific time to execute each of the jobs in the request. In some embodiments, the two or more jobs may correspond to jobs in a batch job. As such, it should be noted that the routine 600 (e.g., and each of the corresponding blocks from 604 to block 614) may also process batch jobs as well. The job execution manager 160 may also assign compute instances to each of the jobs as described, for example, in block 210 of routine 200 of FIG. 2 or block 506 of routine 500 of FIG. 5. During such scheduling, the job execution manager 160 may determine that two or more jobs have short runtime predictions that correspond to a time period of a runtime type associated with a compute instance that is associated with a virtual machine instance in a serverless environment. Therefore, the job execution manager may assign the two or more jobs to a compute instance that is associated with a virtual machine instance in a serverless environment.

At block 606, the job execution manager 160 determine that two or more jobs are capable of being executed in parallel in the serverless environment. In other words, the job execution manager 160 may determine that, since the two or more jobs have short runtime predictions (e.g., between zero to five minutes) and are to be executed in the serverless environment, that such two or more jobs are capable of being executed in parallel. In some embodiments, when the job execution manager 160 executes two or more jobs in parallel, each of the two or more jobs may be executed simultaneously via multiple threads created within a single process. In other embodiments, when the job execution manager 160 executes two or more jobs in parallel, each of the two or more jobs are executed simultaneously on a different processor (e.g., that corresponds to the same worker 142 or different workers 142). In further embodiments, when the job execution manager 160 executes two or more jobs in parallel, each of the two or more jobs are executed simultaneously on a cluster of workers 142 (e.g., distributed computing). In some embodiments, jobs that are generally associated with short runtime predictions (e.g., between zero to five minutes) include at least one of transmitting a file, loading a file, sending email notifications, and calling a function associated with Structured Query Language (SQL).

At block 608, the two or more jobs are executed in parallel in the serverless environment. For example, the job execution manager 160 may transmit a job execution instruction (e.g., having the code associated with job therein) to a specific worker 142 (that is managing the virtual machine instance for executing the job) to have the specific worker 142 execute the job in the serverless environment. At block 610, the job execution manager 160 determines whether an error has occurred in the job execution. An error may occur due to a variety of reasons. For example, there may be an error due to resource limitations, in which the job may exceed the allocated resources (e.g., time, memory, or processing power). More specifically, the job execution manager 160 may have incorrectly generated the final runtime prediction (e.g., the final runtime prediction should have been much longer, such as 30 minutes vs. 15 minutes). Therefore, there were resource limitations in executing the job.

In case that the job execution manager 160 detects an error (block 610, yes), the job execution manager 160 executes the two or jobs in sequence in the serverless environment. For example, executing the two or more jobs in sequence may involve executing each of the two or more jobs sequentially in order (e.g., one job at a time). The execution sequence (e.g., determined during the scheduling of executing the jobs) of the jobs may, for example, depend on the priority level of each job, logical dependencies (e.g., jobs may require completion of other jobs), or workflow definitions (e.g., predetermined process of how jobs are to execute). In some embodiments, the job execution manager 160 may immediately attempt to retry executing the job in sequence in the serverless environment (e.g., no waiting time, such as exponential backoff) thereby optimizing job execution. In other embodiments, in case the two or more jobs fail to execute in sequence in the serverless environment, the routine 600 may continue to block 216 of routine 200 of FIG. 2 or block 512 of the routine 500 of FIG. 5.

In case that the job execution manager 160 determines that there is no error (block 610, no), the routine 600 moves to block 614. For example, the lack of an error may indicate that the job was executed successfully (e.g., with no issues or problems). In some embodiments, the job execution manager 160 may transmit a notification indicating the successful job execution (e.g., transmit such notification to be written in the log file in, for example, a database). The routine ends at block 614.

Example Routine for Training Machine Learning Model(s)

When a routine described herein (i.e., 200, 500, 600, 700) is initiated, as set of executable program instructions stored on one or more non-transitory computer-readable media (e.g., hard drive, flash memory, removable media, etc.) may be loaded into memory (e.g., random access memory or RAM) of a computing device, such as the computing device 800 shown in FIG. 8, and executed by one or more processors. In some embodiments, the routine 200, 500, 600, 700), or portions thereof may be implemented on multiple processors, serially or in parallel.

Figure 7:
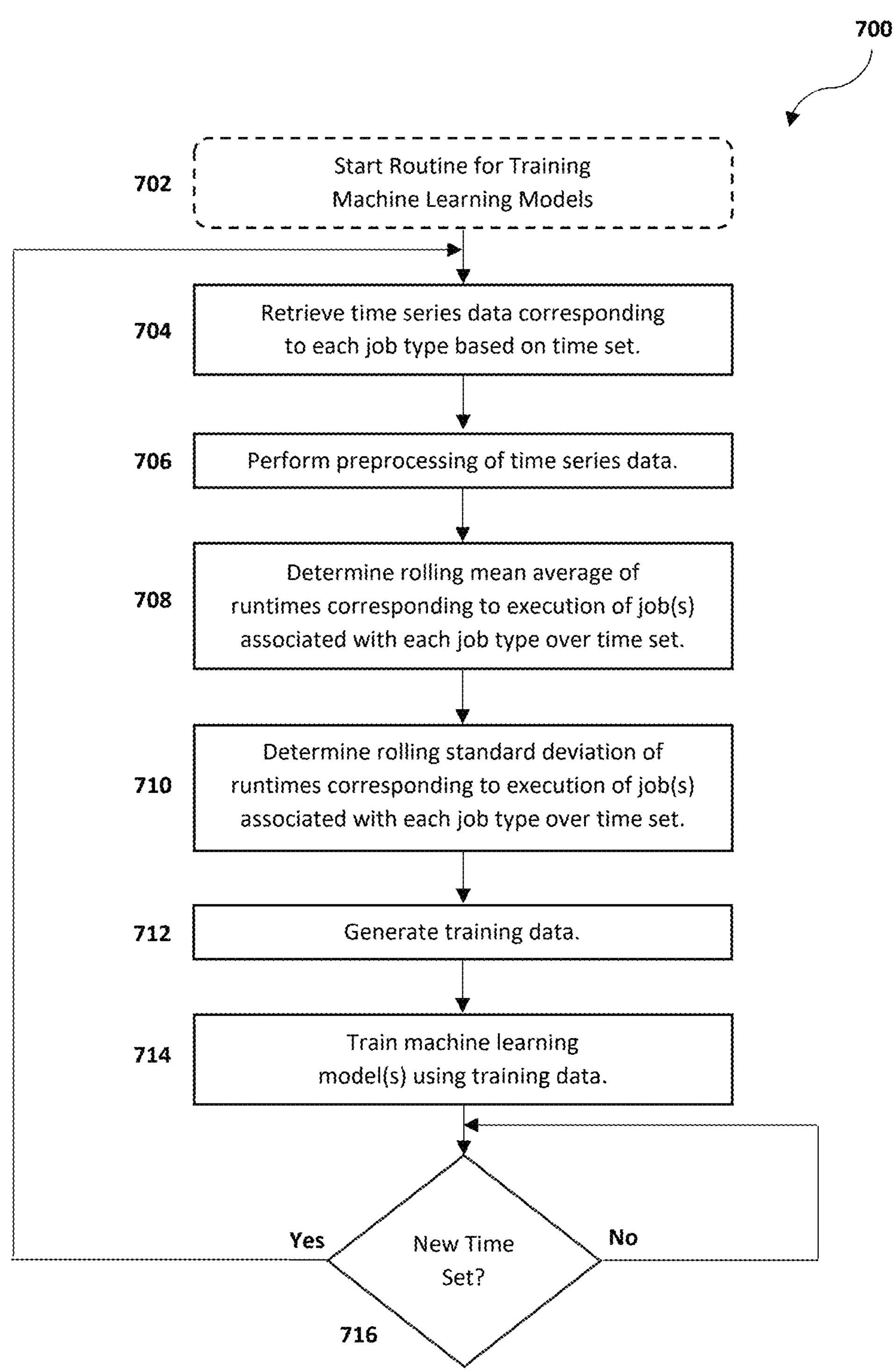
FIG. 7 is a flow diagram of a computerized method for training machine learning models in accordance with aspects of the present disclosure.

FIG. 7 illustrates example routine 700 (beginning at block 702) for training two or more machine learning model(s) that are used by the job execution manager 160. At block 704, the routine 700 retrieves historical data of the on-demand code execution system in the form of time series data corresponding to each job type (e.g., execution type) based on a training time period that is associated with a time set. In some embodiments, the routine 700 also receives time series data corresponding to batch jobs. The time series data may include the following data for each job type: job identifier, measured runtime, and time and date of execution (e.g., second, hour, day, month, year). In some embodiments, the time series data may also include metadata corresponding to the job (e.g., execution type, data size, file size, and job identifier).

In addition, the time series data may be a sequence of data points (e.g., ordered by time) that is recorded over time in regular intervals. The training time period may include one or more units of time (e.g., microseconds, milliseconds, seconds, hours, days, weeks, months, years, etc.). For example, a training time period of twenty-one days may include day as the time unit. In another example, a training time period of forty-five minutes may include minutes as the time unit. The time set may include the specific units of time (e.g., specific days) that correspond to the training time period (e.g., January 1, January 2, January 3, etc.).

There may be many types of jobs (e.g., transmitting a file, loading a file, sending email notifications, and calling a function associated with Structured Query Language (SQL) that execute on the on-demand code execution system 160 over time. Each job may be associated with a job identifier, which is a unique identifier associated with the job. In some embodiments, the frontend 130 generates the job identifier for each job received. After execution of each job on the on-demand code execution system 160, the job execution manager 160 may register a measured (or actual) runtime of each job (e.g., the actual length of time associated with the start of the job execution to the completion of the job execution) in a data storage (e.g., a database).

At block 706, the routine 700 performs preprocessing of the time series data. In some embodiments, the preprocessing may include handling missing values in the data (e.g., a particular day may be missing a runtime associated with a specific job) by, for example, replacing the values in the missing time unit (e.g., particular date) with a runtime of the previous time unit (e.g., previous day) or the average of runtimes in past time units (e.g., previous days). In some embodiments, the preprocessing may include correcting errors in the time series data. In some embodiments, the routine 700 may perform feature engineering in which new features are created from existing data in the time series data. For example, the routine 700 may determine a measured runtime type based on the measured runtime in the time series data. The measured runtime type may correspond to the description of the one or more runtime types in FIG. 4 (e.g., runtime type 1, runtime type 2, . . . , runtime type N). In another example, the time series data may include a step identifier, which is an identifier that identifies individual steps in a job. The routine 700 may combine (e.g., concatenate) each step identifier with the corresponding job identifier to generate a unique identifier for the machine learning model to use. In yet a further example, the routine 700 may perform categorical encoding (e.g., one-hot encoding or label encoding) to convert categorical data into a numerical format.

At block 708, the routine 700 determines the rolling mean average of runtimes corresponding to execution of one or more jobs associated with each job type over a time set. The rolling mean average (RMA) can be represented by the following equation:

$$RMA = \frac{1}{N}\sum_{i=1}^{N} x_i \tag{1}$$

where $x_i$ is the runtime of a specific job (associated with a job type) in a particular time unit of the time set and N is the number of time units in the time set. For example, the time set may be five days (e.g., N), in which a job (associated with a particular job type, e.g., loading a specific file) was executed for each day (e.g., each day, the specific file was loaded once). There may be a measured runtime set including a measured runtime ($x_i$) associated with the job for each of the five days (e.g., 8 minutes for first day, 9 minutes for second day, 11 minutes for third day, 9 minutes for fourth day, 7 minutes for fifth day). As such, according to equation (1), the RMA for the aforementioned measured runtime set is 8.8 minutes.

At block 708, the routine 700 determines rolling standard deviation of runtimes corresponding to execution of job(s) associated with job type over the time set. The rolling standard deviation of runtimes over the time set (a) can be represented by the following equation:

$$\sigma = \sqrt{\frac{1}{N}\sum_{i=1}^{N}(x_i - \mu)^2} \tag{1}$$

where $x_i$ is the runtime of a specific job (associated with a job type) in a particular time unit of the time set; μ is the average runtime of the job over the time set; and Nis the number of time units in the time set. With reference to the aforementioned example in which the time period is five days (e.g., N) and a job (associated with a particular job type, e.g., loading a specific file) was executed for each day (e.g., each day, the specific file was loaded once), there may be a measured runtime set including a measured runtime ($x_i$) associated with the job for each of the five days (e.g., 8 minutes for first day, 9 minutes for second day, 11 minutes for third day, 9 minutes for fourth day, 7 minutes for fifth day). As such, according to equation (2), the rolling standard deviation (σ) for the aforementioned measured runtime set is 1.32 minutes.

At block 712, the routine 700 generates the training data. For example, the training data may include the original time series data (that have been preprocessed or transformed). In another example, the training data may include the new features (obtained via feature engineering, as discussed with respect to block 706 in the routine 700). In a further example, the training data may also include the rolling mean average (RMA) and the rolling standard deviation (σ), as discussed with respect to block 708 in the routine 700 and block 710 in the routine 700, respectively. In some embodiments, the routine 700 may further format the training data to be processable by each of the machine learning models.

At block 714, the routine 700 trains the machine learning models using the training data. For example, each of the machine learning models may receive the same training data. In some embodiments, the machine learning models include at least one of Neural Basis Expansion Analysis with Exogenous Variables (NBEATSx), Neural Hierarchical Interpolation for Time Series Forecasting (N-HITS), Extreme Gradient Boosting (XGBoost), and Light Gradient Boosting Machine (LightGBM).

At block 716, the routine 700 determines whether there is a new time period reached. In other words, the training of the machine learning models is performed continuously (e.g., rolling). For example, the training time period may have been five days that is initially associated with a specific time set (e.g., day 1, day 2, day 3, day 4, day 5). Therefore, the routine 700 generates training data based on the time series data corresponding to the five days in the time set. However, when the next day arrives, the routine 700 may perform a new training (e.g., training performed based on blocks 704, 706, 708, 710, 712, and 714). Such new training may be based on time series data of the next day (e.g., day 6) and the previous four days (e.g., day 2, day 3, day 4, day 5). Likewise, when the subsequent day (e.g., day 7) arrives, the routine 700 may perform another new training (e.g., training performed based on blocks 704, 706, 708, 710, 712, and 714). Such new training may be based on time series data of the subsequent day (e.g., day 7) and the previous four days (e.g., day 3, day 4, day 5, day 6). By performing this continuous training, the machine learning models are able to stay up to date with the measured runtimes of the jobs, and therefore can maintain accurate forecasts of the runtime predictions. As such, in case that there is no new time set (block 716, no), the routine 700 moves back to block 716 again to determine whether there is a new time set. Otherwise, in the case that there is a new time set (block 716, yes), the routine moves back to block 704.

Execution Environment

FIG. 8 depicts a general architecture of a computing device 800 configured to implement various functionality described herein. The general architecture of the job execution manager 800 depicted in FIG. 8 includes an arrangement of computer hardware and software that may be used to implement aspects of the present disclosure. The hardware may be implemented on physical electronic devices, as discussed in greater detail below.

In some embodiments, the computing device 800 may be implemented using any of a variety of computing devices, such as server computing devices, desktop computing devices, personal computing devices, mobile computing devices, mainframe computing devices, midrange computing devices, host computing devise, or some combination thereof.

In some embodiments, the features and services provide by the computing device 800 may be implemented as webs services consumable via one or more communication networks. In further embodiments, the computing device 800 is provided by one or more virtual machines implemented in a hosted computing environment. The hosted computing environment may include one or more rapidly provisioned and released computing resources such as computing devices, networking devices, and/or storage devices. A hosted computing environment may also be referred to as a "cloud" computing environment.

The computing device 800 may include many more (or fewer) elements than those shown in FIG. 8. It is not necessary, however, that all of these generally conventional elements be shown in order to provide an enabling disclosure. Additionally, the general architecture illustrated in FIG. 8 may be used to implement one or more of the other components illustrated in FIG. 1.

As illustrated, the job execution manager 800 includes a processor 802, such as physical central processing units ("CPUs"); a network interface 804, such as network interface cards ("NICs"); one or more computer readable medium drives 806, and an input/output device interface 808, and one or more computer-readable memories 810, such as a high density disk ("HDDs"), solid state drives ("SSDs"), flash drives, and/or other persistent computer readable media; one or more input/output drive interfaces 808; and one or more computer-readable memories 810, such as random access memory ("RAM") and/or other volatile non-transitory readable media, all of which may communicate with one another by way of a communication bus.

The network interface 804 may provide connectivity to one or more networks or computing systems. The processor 802 may thus receive information and instructions from other computing systems or services via the network 104. The processor 802 may also communicate to and from the one or more computer-readable memories 810 and further provide output information for an optional display (not shown) via the input/output device interface 808. The input/output device interface 808 may also accept input from an optional input device (not shown).

The one or more computer-readable memories 810 may contain computer program instructions (grouped as units in some embodiments) that the processor 802 executes in order to implement one or more aspects of the present disclosure. These program instructions are shown in FIG. 8 as included within the one or more computer-readable memories 810. The one or more computer-readable memories 810 correspond to one or more tiers of memory devices, including (but not limited to) RAM, 3D XPOINT memory, flash memory, magnetic storage, and the like.

The one or more computer-readable memories 810 may store an operating system 812 that provides computer program instructions for use by the processor 802 in the general administration and operation of the computing device 800. The one or more computer-readable memories 810 may further include computer program instructions and other information for implementing aspects of the present disclosure. For example, in one embodiment, the one or more computer-readable memories 810 includes an interface module 814 that generates user interfaces (or instructions therefor) for display upon a computing device, e.g., via a navigation or browsing interface such as a browser or application installed on the computing device. The one or more computer-readable memories 810 may include a job execution manager 816 (e.g., job execution manager 160), which is configured to execute and manage jobs on an on-demand code execution system (e.g., on-demand code execution system 120). The one or more computer-readable memories 810 may also include machine learning model(s) 818 (e.g., machine learning models stored in machine learning store 170) which may be accessible by the job execution manager 816.

The computing device 800 of FIG. 8 is one illustrative configuration of such a device, of which others are possible. For example, while shown as a single device, a computing device 800 may in some embodiments be implemented as multiple physical host devices.

Terminology

The term "model," as used in the present disclosure, can include computer-based models of any type and of any level of complexity, such as any type of sequential, functional, or concurrent model. Models can further include various types of computation models, such as, for example, artificial neural networks ("NN"), language models (e.g., large language models ("LLMs")), artificial intelligence ("AI") models, machine learning ("ML") models, multimodals (e.g., models or combinations of models that can accept inputs of multiple modalities, such as images and text), and/or the like. While certain aspects and implementations are discussed herein with reference to use of a ML model, those aspects and implementations may be performed any other AI model, generative AI model, generative model, NN, multimodal model, and/or other algorithmic processes.

In various implementations, the ML models of the present disclosure may be locally hosted, cloud managed, accessed via one or more Application Programming Interfaces ("API's"), and/or any combination of the foregoing and/or the like. Additionally, in various implementations, the ML models of the present disclosure may be implemented in or by electronic hardware such application-specific processors (e.g., application-specific integrated circuits ("ASICs")), programmable processors (e.g., field programmable gate arrays ("FPGAs")), application-specific circuitry, and/or the like. Data that may be queried using the systems and methods of the present disclosure may include any type of electronic data, such as text, files, documents, books, manuals, emails, images, audio, video, databases, metadata, positional data (e.g., geo-coordinates), geospatial data, sensor data, web pages, time series data, and/or any combination of the foregoing and/or the like. In various implementations, such data may comprise model inputs and/or outputs, model training data, modeled data, and/or the like.

Examples of models, language models, and/or LLMs that may be used in various implementations of the present disclosure include, for example, Neural Basis Expansion Analysis with Exogenous Variables (NBEATSx), Neural Hierarchical Interpolation for Time Series Forecasting (N-HITS), Extreme Gradient Boosting (XGBoost), and Light Gradient Boosting Machine (LightGBM), Bidirectional Encoder Representations from Transformers (BERT), LaMDA (Language Model for Dialogue Applications), PaLM (Pathways Language Model), PaLM 2 (Pathways Language Model 2), Generative Pre-trained Transformer 2 (GPT-2), Generative Pre-trained Transformer 3 (GPT-3), Generative Pre-trained Transformer 4 (GPT-4), LLaMA (large Language Model Meta AI), and BigScience Large Open-science Open-access Multilingual Language Model (BLOOM).

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus (e.g., a programmable processor, a computer, and/or multiple computers). A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites. The computer program can be deployed in a cloud computing environment (e.g., Amazon® AWS, Microsoft® Azure, IBM®).

Method steps can be performed by one or more processors executing a computer program to perform functions of the invention by operating on input data and/or generating output data. Method steps can also be performed by, and an apparatus can be implemented as, special purpose logic circuitry (e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like). Subroutines can refer to portions of the stored computer program and/or the processor, and/or the special circuitry that implement one or more functions.

Processors suitable for the execution of a computer program include, by way of example, special purpose microprocessors specifically programmed with instructions executable to perform the methods described herein, and any one or more processors of any kind of digital or analog computer. Generally, a processor receives instructions and data from a read-only memory or a random-access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data (e.g., magnetic, magneto-optical disks, or optical disks). A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices (e.g., DRAM, SRAM, EPROM, EEPROM, and flash memory devices); magnetic disks (e.g., internal hard disks or removable disks); magneto-optical disks; and optical disks (e.g., CD, DVD, HD-DVD, and Blu-ray disks). The processor and the memory can be supplemented by and/or incorporated in special purpose logic circuitry.

To provide for interaction with a user, the above-described techniques can be implemented on a computing device in communication with a display device (e.g., a CRT (cathode ray tube), plasma, or LCD (liquid crystal display) monitor, a mobile device display or screen, a holographic device and/or projector, for displaying information to the user and a keyboard and a pointing device (e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback (e.g., visual feedback, auditory feedback, or tactile feedback; and input from the user can be received in any form, including acoustic, speech, and/or tactile input).

The above-described techniques can be implemented in a distributed computing system that includes a back-end component. The back-end component can, for example, be a data server, a middleware component, and/or an application server. The above-described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above-described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

The above-described techniques can be implemented using supervised learning and/or machine learning algorithms. Supervised learning is the machine learning task of learning a function that maps an input to an output based on example input-output pairs. It infers a function from labeled training data consisting of a set of training examples. Each example is a pair consisting of an input object and a desired output value. A supervised learning algorithm or machine learning algorithm analyzes the training data and produces an inferred function, which can be used for mapping new examples.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

What is claimed is:

1. A computing system for optimizing job execution on an on-demand code execution system, the system comprising memory for storing computer-executable instructions and a processor that executes the computer-executable instructions to:

receive instructions to execute a job having user code on the on-demand code execution system which comprises one or more compute instances that are ordered sequentially based on size;

generate, via two or more machine learning models, a runtime prediction set for the job, the runtime prediction set including a runtime prediction that is generated by each machine learning model of the two or more machine learning models, wherein each runtime prediction is a forecast of the runtime associated with executing the job;

assign a computer instance of the one or more compute instances to the job based on a runtime type of the job, wherein the runtime type of the job is determined based on the runtime prediction having the longest runtime; and continuously attempt to execute the job on the compute instance, wherein the job is assigned a new compute instance that is larger in size than a current compute instance upon detection of an execution error when attempting to execute the job on the current compute instance.

2. The computing system of claim 1, wherein the one or more compute instances includes a serverless environment and a container environment, the container environment having one or more containers that are ordered sequentially based on size.

3. The computing system of claim 2, wherein the runtime type is selected from one or more runtime types, and wherein a first runtime type is associated with the serverless environment, and the remaining runtime types are associated with the one or more containers in the container environment.

4. The computing system of claim 3, wherein a processor that executes the computer-executable instructions cause the processor to perform further operations to:

determine that two or more jobs are each assigned a first runtime type and are each capable of being executed independently from each other; and execute the two or more jobs in parallel in the serverless environment.

5. The computing system of claim 4, wherein a processor that executes the computer-executable instructions cause the processor to perform further operations to:

detect an execution error when attempting to execute the two or more jobs in parallel in the serverless environment; and execute the two or more jobs in parallel in at least one of the one or more containers in the container environment.

6. The computing system of claim 3, wherein a job associated with a first runtime type is associated with at least one of the following execution types: transmitting a file, loading a file, sending email notifications, and calling a function associated with Structured Query Language (SQL).

7. The computing system of claim 3, wherein the remaining runtime types includes a second runtime type and a third runtime type, and wherein the first runtime type is associated with a time period that is greater or equal to zero and less than five minutes, the second runtime type is associated with a time period that is greater than or equal to five minutes and less than fifteen minutes, and the third runtime type is associated with a time period that is greater than or equal to fifteen minutes.

8. The computing system of claim 1, wherein the runtime prediction is determined based on metadata of the job, wherein the metadata includes at least one of execution type, data size, file size, and job identifier.

9. The computing system of claim 1, wherein the execution error includes at least one of the following: failure to load data into the compute instance, insufficient memory in the compute instance to load data into, insufficient memory in the compute instance to execute the job, and failure in portions of the on-demand code execution system.

10. The computing system of claim 1, wherein the size of the compute instance corresponds to at least one of the memory of the compute instance, the processing power of the computer instance, and a maximum permitted time that a job is allowed to execute on the compute instance.

11. The computing system of claim 1, wherein the two or more machine learning models are continuously trained, at predetermined time intervals, by using historical job data corresponding to one or more jobs that were executed successfully or unsuccessfully.

12. The computing system of claim 1, wherein the two or more machine learning models includes at least one of Neural Basis Expansion Analysis with Exogenous Variables (NBEATSx), Neural Hierarchical Interpolation for Time Series Forecasting (N-HITS), Extreme Gradient Boosting (XGBoost), and Light Gradient Boosting Machine (LightGBM).

13. A computerized method for optimizing job execution on an on-demand code execution system, the method comprising:

receiving instructions to execute a job having user code on the on-demand code execution system which comprises one or more compute instances that are ordered sequentially based on size;

generating, via two or more machine learning models, a runtime prediction set for the job, the runtime prediction set including a runtime prediction that is generated by each machine learning model of the two or more machine learning models, wherein each runtime prediction is a forecast of the runtime associated with executing the job;

assigning a compute instance of the one or more compute instances to the job based on a runtime type of the job, wherein the runtime type of the job is determined based on the runtime prediction having the longest runtime; and continuously attempting to execute the job on the compute instance, wherein the job is assigned a new compute instance that is larger in size than a current compute instance upon detection of an execution error when attempting to execute the job on the current compute instance.

14. The computerized method of claim 13, wherein the one or more compute instances includes a serverless environment and a container environment, the container environment having one or more containers that are ordered sequentially based on size.

15. The computerized method of claim 14, wherein the runtime type is selected from one or more runtime types, and wherein a first runtime type is associated with the serverless environment, and the remaining runtime types are associated with the one or more containers in the container environment.

16. The computerized method of claim 15, further comprising:

determining that two or more jobs are each assigned a first runtime type and are each capable of being executed independently from each other; and executing the two or more jobs in parallel in the serverless environment.

17. The computerized method of claim 16, further comprising:

detecting an execution error when attempting to execute the two or more jobs in parallel in the serverless environment; and execute the two or more jobs in parallel in at least one of the one or more containers in the container environment.

18. The computerized method of claim 15, wherein a job associated with a first runtime type is associated with at least one of the following execution types: transmitting a file, loading a file, sending email notifications, and calling a function associated with Structured Query Language (SQL).

19. The computerized method of claim 15, wherein the remaining runtime types includes a second runtime type and a third runtime type, and wherein the first runtime type is associated with a time period that is greater or equal to zero and less than five minutes, the second runtime type is associated with a time period that is greater than or equal to five minutes and less than fifteen minutes, and the third runtime type is associated with a time period that is greater than or equal to fifteen minutes.

20. The computerized method of claim 13, wherein the runtime prediction is determined based on metadata of the job, wherein the metadata includes at least one of execution type, data size, file size, and job identifier.

21. The computerized method of claim 13, wherein the execution error includes at least one of the following: failure to load data into the compute instance, insufficient memory in the compute instance to load data into, insufficient memory in the compute instance to execute the job, and failure in portions of the on-demand code execution system.

22. The computerized method of claim 13, wherein the size of the compute instance corresponds to at least one of the memory of the compute instance, the processing power of the computer instance, and a maximum permitted time that a job is allowed to execute on the compute instance.

23. The computerized method of claim 13, wherein the two or more machine learning models are continuously trained, at predetermined time intervals, by using historical job data corresponding to one or more jobs that were executed successfully or unsuccessfully.

24. The computerized method of claim 13, wherein the two or more machine learning models includes at least one of Neural Basis Expansion Analysis with Exogenous Variables (NBEATSx), Neural Hierarchical Interpolation for Time Series Forecasting (N-HITS), Extreme Gradient Boosting (XGBoost), and Light Gradient Boosting Machine (LightGBM).

* * * * *